(12) United States Patent
Garagic et al.

(10) Patent No.: US 11,087,228 B2
(45) Date of Patent: Aug. 10, 2021

(54) GENERIC PROBABILISTIC APPROXIMATE COMPUTATIONAL INFERENCE MODEL FOR STREAMING DATA PROCESSING

(71) Applicant: BAE Systems Information and Electronic Systems Integration Inc., Nashua, NH (US)

(72) Inventors: Denis Garagic, Wayland, MA (US); Bradley J Rhodes, Reading, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1349 days.

(21) Appl. No.: 15/235,879

(22) Filed: Aug. 12, 2016

(65) Prior Publication Data

US 2017/0161638 A1 Jun. 8, 2017

Related U.S. Application Data

(60) Provisional application No. 62/204,069, filed on Aug. 12, 2015.

(51) Int. Cl.
    *G06N 7/00* (2006.01)
(52) U.S. Cl.
    CPC .................................. *G06N 7/005* (2013.01)
(58) Field of Classification Search
    None
    See application file for complete search history.

(56) References Cited

U.S. PATENT DOCUMENTS

| | | | | |
|---|---|---|---|---|
| 9,129,158 | B1* | 9/2015 | Medasani | G06K 9/00335 |
| 9,882,949 | B1* | 1/2018 | Kalki | H04L 65/60 |
| 2003/0123703 | A1* | 7/2003 | Pavlidis | G08B 13/19643 |
| | | | | 382/103 |
| 2006/0115145 | A1* | 6/2006 | Bishop | G06K 9/6296 |
| | | | | 382/155 |
| 2012/0274781 | A1* | 11/2012 | Shet | G06K 9/6857 |
| | | | | 348/169 |

(Continued)

OTHER PUBLICATIONS

Helou, Akram, and Chau Nguyen. "Unsupervised deep learning for scene recognition." (2011): 1-10. (Year: 2011).*

(Continued)

*Primary Examiner* — Daniel T Pellett
(74) *Attorney, Agent, or Firm* — Maine Cernota & Rardin

(57) ABSTRACT

A generic online, probabilistic, approximate computational inference model for learning-based data processing is presented. The model includes detection, feature production and classification steps. It employs Bayesian Probabilistic Models (BPMs) to characterize complex real-world behaviors under uncertainty. The BPM learning is incremental. Online learning enables BPM adaptation to new data. The available data drives BPM complexity (e.g., number of states) accommodating spatial and temporal ambiguities, occlusions, environmental clutter, and large inter-domain data variability. Generic Sequential Bayesian Inference (GSBI) efficiently operates over BPMs to process streaming or forensic data. Deep Belief Networks (DBNs) learn feature representations from data. Examples include model applications for streaming imagery (e.g., video) and automatic target recognition (ATR).

20 Claims, 20 Drawing Sheets

(56) References Cited

U.S. PATENT DOCUMENTS

2014/0114888 A1* 4/2014 Noda .................. G06N 20/00
706/12

OTHER PUBLICATIONS

Elgammal, Ahmed, David Harwood, and Larry Davis. "Non-parametric model for background subtraction." European conference on computer vision. Springer, Berlin, Heidelberg, 2000. (Year: 2000).*

* cited by examiner

SENSOR AGNOSTIC STREAMING DATA PROCESSING PIPELINE (DPP)

GENERIC SEQUENTIAL BAYESIAN INFERENCE

PROBABILISTIC DETECTION AND SEGMENTATION

300

```
Input:
S.I – [1200x900]pixels/frame
    • P ~50... number of particles per pixel
      per frame
    • S.1 – [1x3]/frame
    • S.2 – [12xP]/frame
    • S.2a – [1xP]/frame
    • S.3 – [12xP]/frame
    • S.4 – [1xP]/frame
    • S.5 – [12xP]/frame
    • S.6 – [1x1]/frame Intermediate Output:
S.O.1 – [1200x900x1]/frame
        Labeled(background/foreground)
Pixels
Output:
S.O – [(4096+30)xK]/frame K – Max number of detected Blobs per frame
F ~4096 [max pixels/blob]
Fother ~ max(30) features/blob per frame
```

EXAMPLE OF DATA PROCESSED IN THE PROBABILISTIC DETECTION AND SEGMENTATION PORTION OF THE GENERIC PACIM

FIG. 3

PROBABILISTIC DETECTION AND SEGMENTATION PROCEDURE

PROBABILISTIC MULTI-EVENT TRACKING & ASSOCIATION USING GENERIC PACIM

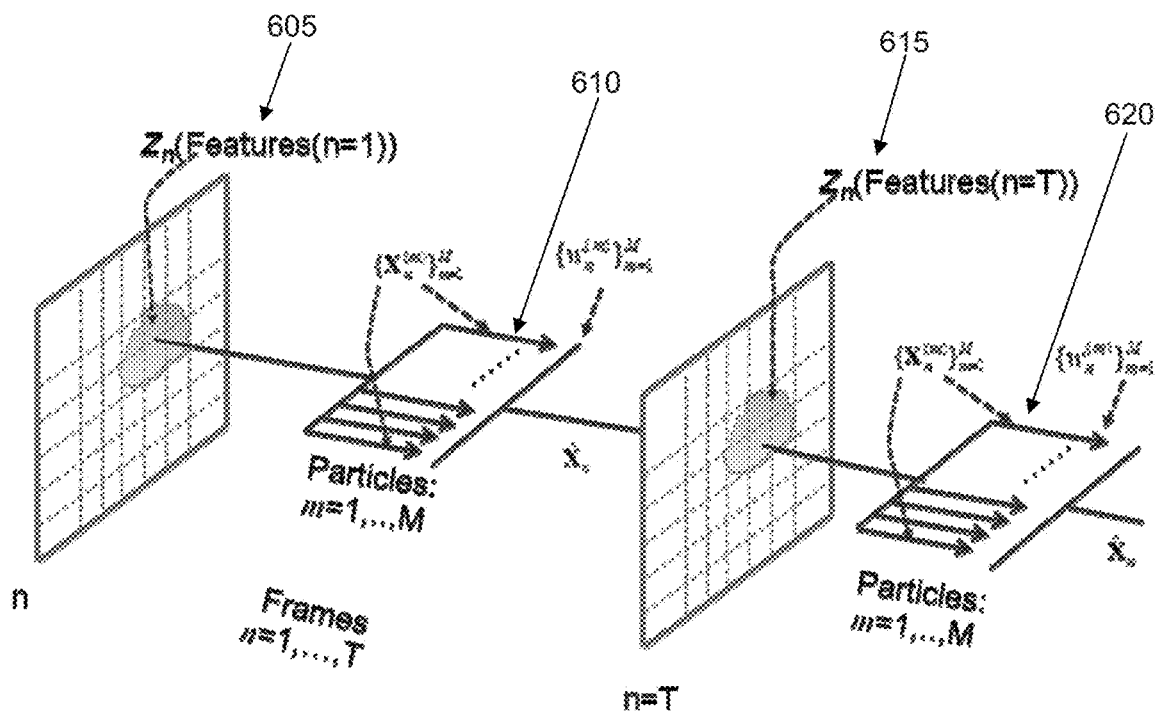
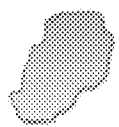 ... Observations $Z_n$ at time frame $n$ (Obtained by Segmentation)
Goal: Estimate Target's Hidden States $X_n$
FIG. 6

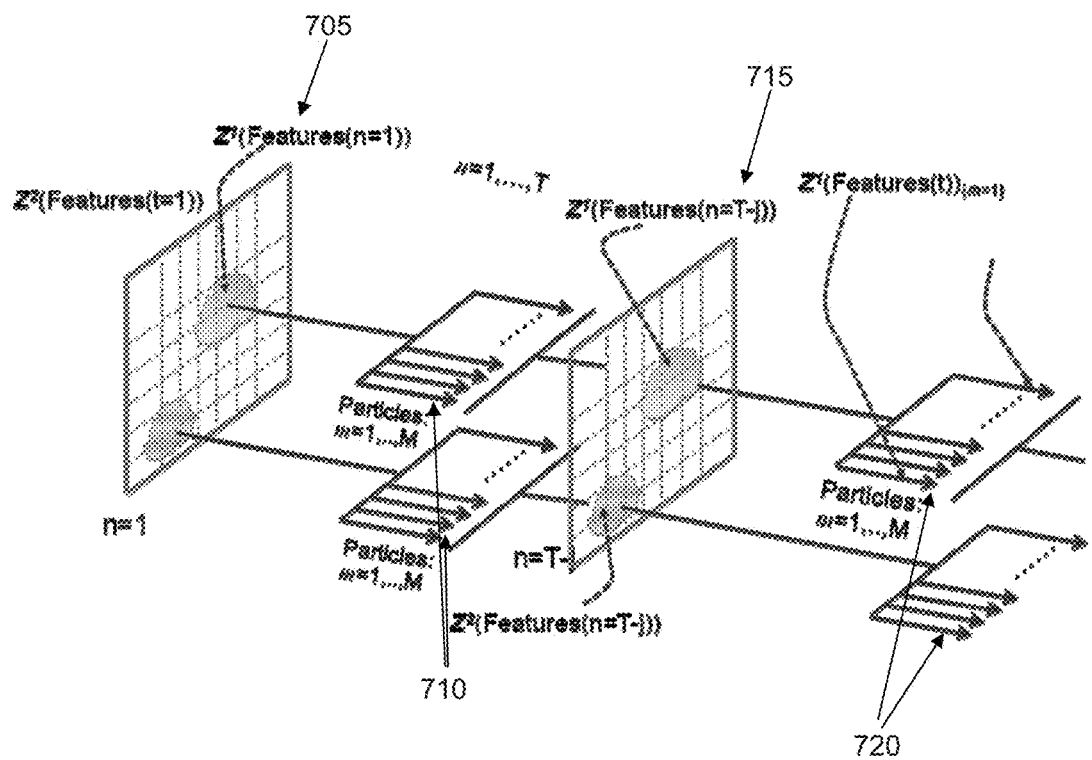
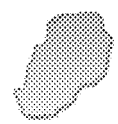 ... Observations $Z_n$ at time frame $n$ (Obtained by Segmentation)
Goal: Estimate Target's Hidden States $X_n$
PROBABILISTIC MULTIPLE-TARGET FEATURE-BASED TRACKING USING GENERIC
PROBABILISTIC COMPUTATIONAL INFERENCE MODEL
FIG. 7

PROBABILISTIC CLASSIFICATION & ACTIVITY RECOGNITION

PACIM COGNITIVE ATR

PACIM-ATR DETECTION STAGE

1100

1105

DETECTION OF TARGETS OF INTEREST FROM SAR IMAGERY

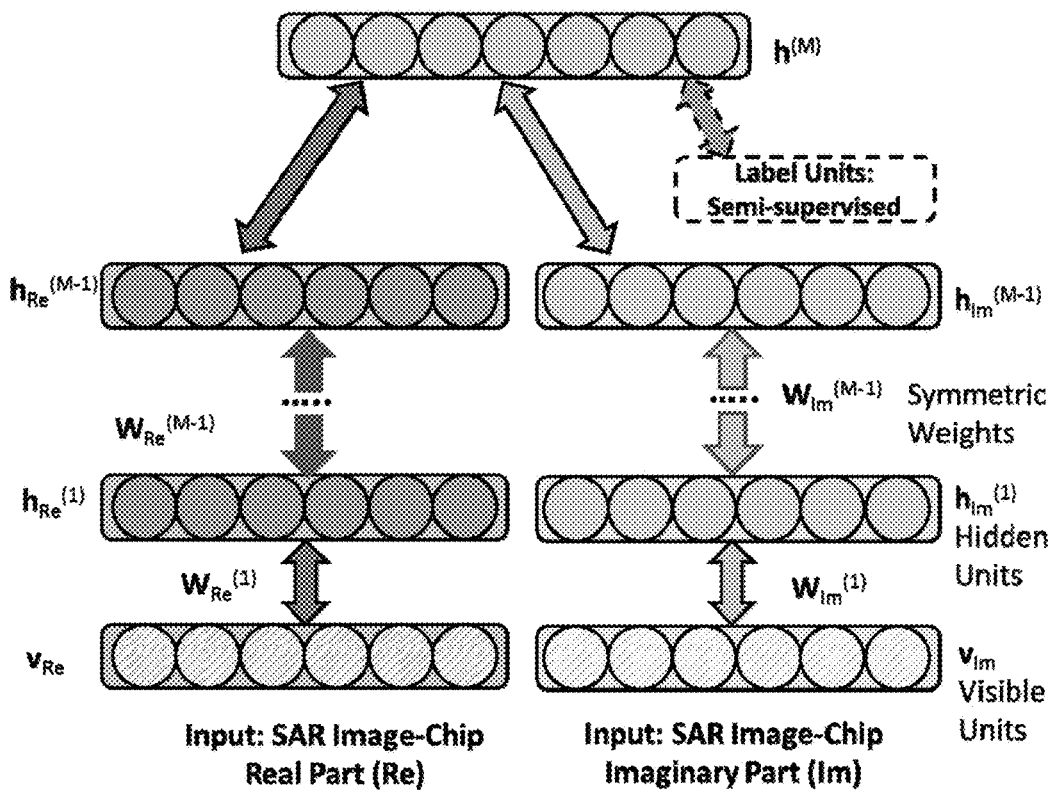
FIG. 12 — MULTIMODAL DEEP BELIEF NETWORKS LEARN JOINT DISTRIBUTION OF EMBEDDED MANIFOLD REPRESENTATION IN COMPLEX-VALUED IMAGES

MULTI-MODAL SAR CHIPS

LEARNING TO RECOGNIZE KNOWN AND UNKNOWN TARGETS AT MULTIPLE LEVELS OF HIERARCHY

1500

SAR IMAGE DATA

FEATURE EXTRACTION FROM TRAINING DATA COMPRISING SIX CLASSES OF TARGETS

PACIM-ATR CLASSIFICATION PERFORMANCE WITH LIMITED / SPARSE TRAINING DATA
CLASSIFICATION AVERAGE ACCURACY VS. QUANTITY OF TRAINING DATA

1800

1810 → *40% Training Data; 60% Testing Data* ← 1820

| | | Actual Class | | | | | |
|---|---|---|---|---|---|---|---|
| | | BMP1 C16 | BRDM2 E72 | BTR70 C73 | SA13 D30 | SCUD R26 | T72 A07 |
| Predicted Class | BMP1 | 213 | 1 | 1 | 1 | 11 | 2 |
| | BRDM2 | 0 | 205 | 16 | 10 | 0 | 4 |
| | BTR70 | 3 | 8 | 199 | 4 | 0 | 1 |
| | SA13 | 0 | 1 | 0 | 188 | 0 | 8 |
| | SCUD | 0 | 0 | 0 | 0 | 205 | 0 |
| | T72 | 0 | 1 | 0 | 13 | 0 | 201 |

1830 →

Measure of Performance:
- Classification Error = 0.066
- Accuracy = 0.934
- Precision = 0.936
- Recall = 0.934
- Gmean1 = 0.935
- F-Score = 0.935

SUPERVISED SAR ATR CLASS IDENTIFICATION RESULTS DEMONSTRATE
EFFECTIVE PACIM-ATR PERFORMANCE

SUPERVISED TARGET CLASS IDENTIFICATION PERFORMANCE USING 40% OF DATA FOR
TRAINING

| Level 1 | Actual Class | | | | |
|---|---|---|---|---|---|
| | BMP1 C16 | SA13 D30 | BRDM2 E72 | BTR70 C73 | Unknown (T72-A07) |
| Predicted Class — BMP1 | 94 | 7 | 0 | 0 | 0 |
| SA13 | 6 | 90 | 2 | 0 | 0 |
| BRDM2 | 0 | 3 | 91 | 2 | 0 |
| BTR70 | 0 | 0 | 6 | 90 | 2 |
| Unknown | 0 | 0 | 1 | 8 | 98 |

LEVEL 1 EXPERIMENTAL RESULTS – KNOWN & UNKNOWN CLASSES

| Level 2 | Actual Class | | |
|---|---|---|---|
| | Tracked (T) | Wheeled (W) | Unknown (U) |
| Predicted Class — T | 192 | 2 | 0 |
| W | 8 | 189 | 2 |
| U | 0 | 9 | 98 |

LEVEL 2 EXPERIMENTAL RESULTS – KNOWN & UNKNOWN CLASSES

FIG. 19B

ACCURATE PACIM-ATR TARGET DETECTION & RECOGNITION WITHIN A SMALL ONBOARD SWaP ENVELOPE

GENERIC PROBABILISTIC APPROXIMATE COMPUTATIONAL INFERENCE MODEL FOR STREAMING DATA PROCESSING

RELATED APPLICATION

This application claims the benefit of U.S. Provisional Application No. 60/204,069 filed 12 Aug. 2015. This application is herein incorporated by reference in its entirety for all purposes.

STATEMENT OF GOVERNMENT INTEREST

The invention was made with United States Government support under Contract No. HR0011-13-C-0051 awarded by DEFENSE ADVANCED RESEARCH PROJECTS AGENCY (DARPA). The United States Government has certain rights in this invention.

FIELD OF THE DISCLOSURE

Embodiments relate to data processing, and more particularly, to a generic probabilistic approximate computational inference model for streaming data processing.

BACKGROUND

There is a need for efficient real-time or near real-time recognition of objects of interest and their behaviors in generic environments that is robust, not requiring significant training. Such capabilities should be applicable across behavior domains, including (but not limited to) consumers, drivers, communications signals, military targets, speech, human emotions, and financial markets. Current solutions tend to be specialized to particular environments and/or behavior domains and require notable training before deployment. Additionally, adaptability to unknown classes of objects of interest is typically limited.

What is needed is a method and system to generically process streaming data that requires little or no training, consumes few resources, and produces reliable, accurate results for known and unknown objects of interest and their behaviors.

SUMMARY

An embodiment provides a method performed by at least one computer processing unit for online, probabilistic, approximate computational inference modeling of input representing features to be labeled, the method comprising detecting and segmenting a plurality of signals to create a plurality of features (115), the detecting and segmenting comprising observed pixel values and labeled classified pixel background states (400); tracking and associating the plurality of features to create a plurality of tracks (120), the tracking and associating comprising track detection assignment and output estimation (500), (600), (700); extracting and optimizing the plurality of features (125) (230); classifying and recognizing the plurality of features and/or tracks (130), the classifying and recognizing comprising classifier conditions (815) and models (820) (800); and creating one or more labels associated with the features and/or tracks on output. In embodiments a portion of the model processes observations collected within a time interval and generates particles, calculates weights, normalizes weights, and/or resamples to obtain approximate posterior distribution and an inferred hidden state. In other embodiments an online generic probabilistic inference is used in all processing areas, providing optimal performance with respect to energy, speed, and accuracy. In subsequent embodiments a closed-loop characteristic adds on-the-fly performance-driven Data Processing Pipeline (DPP) adaptation to changing environments and behaviors. For additional embodiments error tolerance accommodates noisy streaming data that contain spatial and temporal ambiguities, occlusions, clutter, and large degrees of variability. In another embodiment direct processing pipeline comprises adaptive modeling loops for each stage comprising detection, feature production, and open set classification. For a following embodiment real world data comprises intelligence, surveillance, and reconnaissance (ISR) data, video sequences and imagery, radio frequency (RF) signals, medical and biometric data comprising brain data and audio data, neuroscience data, consumer shopping, and finance data. Subsequent embodiments comprise Bayesian Probabilistic Models (BPMs) to characterize complex real-world behaviors under uncertainty. Additional embodiments comprise Sensor Agnostic Stream Processing and Generic Sequential Bayesian Inference (GSBI) whereby the method efficiently operates over BPMs to process streaming or forensic data as a Data Processing Pipeline (DPP). In included embodiments online generic probabilistic inference is used in all processing areas ensuring optimal performance with respect to energy, speed, and accuracy. In yet further embodiments resampling eliminates particles with small weights and replicates particles with large weights. Related embodiments comprise detected blobs with features input as random variables, the features including phenomenology based features of curvature, banding energy, change in direction, centricity, area, volume, color, texture based features optical flow based features and manifold projected features generated by deep generative models. For further embodiments the model synthesizes Deep Belief Networks (DBNs) to learn feature representations from imagery data. Ensuing embodiments comprise Incremental Hierarchical Nonparametric Bayesian (HNPB) machine learning methods to learn and recognize known and unknown targets in real time, and predict their behavior when data is missing and/or obscured.

Another embodiment provides online, probabilistic, approximate computational inference modeling comprising: a processor; memory coupled to the processor, wherein the memory includes an online, probabilistic, approximate computational inference modeling module to detect and segment a plurality of signals to create a plurality of features; track and associate the plurality of features to create a plurality of tracks; and classify and recognize the plurality of tracks to create one or more labels. Yet further embodiments comprise an image size of about 3600×3600 pixels; detections/image of about 1,000; a detection chip size of about 32×32 pixels; features of about 500; energy per operation of about 100 pJ; an image frame rate of about 0.33 Hz; a memory precision of about 16 bits; detection parameters of about 20; feature production hidden nodes of about 400; and feature production layers of about 4. For more embodiments direct processing pipeline comprises Detect Salience, SAR Chips, Process Features, Manifold Representation, ID/Pose/Location, Model Score, Target Class Hypotheses, and Model Match blocks from input data through ID/pose/location estimation features. Continued embodiments include that each level 1 class describes a distribution over feature data values, each level 2 class describes a distribution over level 1 class model parameter values, and a single level 3 universal class describes distribution over level 2 class model parameters. Additional embodiments comprise a confusion matrix (1800).

A yet further embodiment provides A non-transitory computer-readable storage medium including instructions that are configured, when executed by a computing system, to perform a method for online, probabilistic, approximate computational inference modeling, the method comprising detecting and segmenting a plurality of signals to create a plurality of features (115); tracking and associating the plurality of features to create a plurality of tracks (120); and classifying and recognizing the plurality of tracks (130) to create one or more labels (825); wherein a Generic Sequential Bayesian Inference Model (805) is used in all major processing areas; wherein the method comprises adaptive modeling loops (900) for each stage of the detection, the feature production, and the open set classification.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 3 shows one embodiment of the data processed in the probabilistic detection and segmentation portion of the generic PACIM of the present invention.

FIG. 6 shows a diagram of one embodiment of the probabilistic single-target feature-based tracking using generic PACIM of the present invention.

FIG. 7 shows a diagram of one embodiment of the probabilistic tracking and association portion of the generic probabilistic inference model of the present invention for multi-target, feature-based tracking.

FIG. 12 shows a flowchart of one embodiment of the feature production step for the cognitive automatic target recognition application using the generic PACIM of the present invention.

FIG. 18 shows a performance analysis table using limited training data for one embodiment of the cognitive automatic target recognition application using the generic PACIM of the present invention.

FIG. 19A and FIG. 19B show tables of % correct data in one embodiment of the cognitive automatic target recognition application using the generic PACIM of the present invention.

Figure 1A:
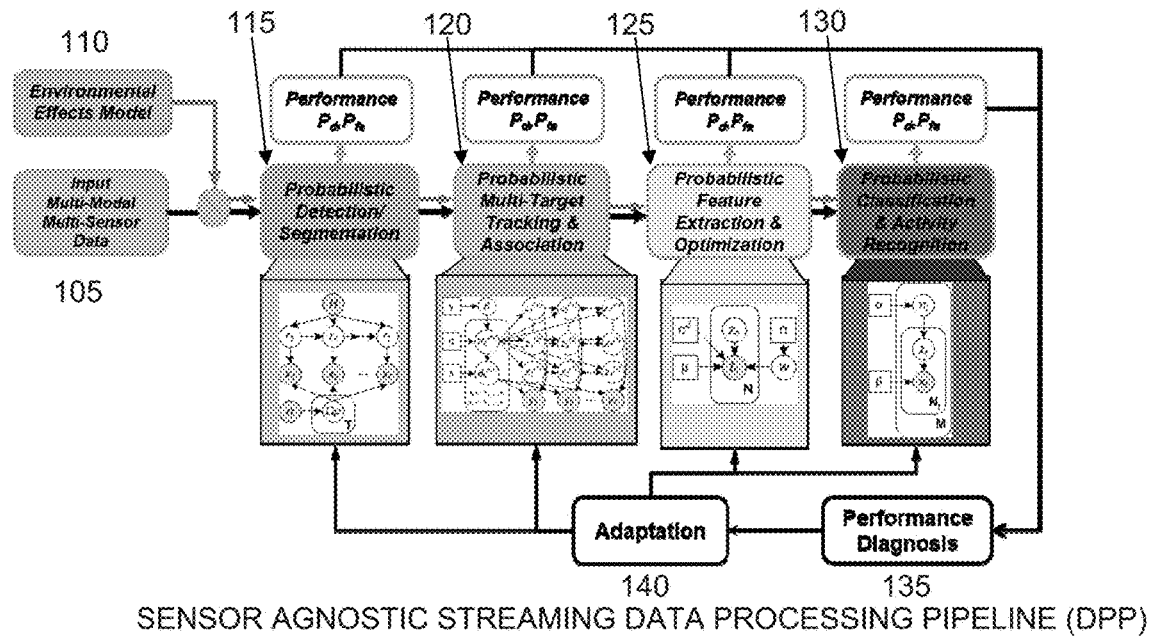
FIG. 1A shows a flowchart of one embodiment of the sensor agnostic streaming data processing pipeline (DPP) of the present invention.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

The Probabilistic Approximate Computational Inference Model (PACIM) provides a single generic approach for probabilistic inference over learned probabilistic model representations to address key challenges for realizing flexible yet efficient data processing in both software and hardware. Benefits accruing from PACIM's single, adaptable probabilistic representational and inference umbrella include: One, a uniform mechanism to solve a broad range of multi-modality problems; Two, error tolerance adequate for accommodating noisy streaming data that contain spatial and temporal ambiguities, occlusions, clutter, and large degrees of variability; Three, minimal critical loss in accuracy with fewer representational restrictions than existing software and hardware, e.g., PACIM exhibits robustness to fixed point implementation with stringent bit-width constraints; and Four, implementation in hardware that is not application-specific while yielding orders of magnitude speed increases and energy efficiency gains relative to extant approaches without sacrificing accuracy One aspect of the present invention provides a generic parallelizable probabilistic approximate computing inference model that performs all steps in a multi-step data processing pipeline; rigorously and robustly combines uncertainties in physical measurements with calculation uncertainty (driven by the underlying approximate computing hardware paradigm); performs pattern recognition, segmentation (to detect, e.g., objects in imagery/video/radar data, transmission events in signals data, sessions/events/voyages in time series data, events in medical and biometric data), tracking (of detections over time), single- and multiple-entity type and activity classification and recognition, regression, and time series analysis; and applies across domains which generate complex (noisy and high dimensional) streaming real world data, such as ISR (intelligence, surveillance, and reconnaissance) data, video sequences and imagery, RF (radio frequency—e.g., communications devices such as radios and phones or radar devices) signals, medical and biometric data (e.g., brain data, audio, etc.), neuroscience, finance, and the like.

In certain embodiments, PACIM comprises non-parametric statistical models and online statistical inference mechanisms. PACIM adaptively estimates model parameters and performs approximate probabilistic prediction and decision-making. From sparse, noisy input data streams, PACIM performs multiple target detection (e.g., segmentation in a streaming video context), tracking, and classification of hidden patterns and activities characterizing those targets.

In certain embodiments, Bayesian Probabilistic Models (BPMs) characterize complex real-world behaviors under uncertainty. BPM learning is incremental. This online learning enables BPM adaptation to new data on-the-fly. Being nonparametric, available data drives BPM complexity (e.g., number of states) to accommodate spatial and temporal ambiguities, occlusions, environmental clutter, and large inter-domain data variability. In certain embodiments, Generic Sequential Bayesian Inference (GSBI) efficiently operates over BPMs to process streaming or forensic data.

FIG. 1A is a flowchart 100 showing a Sensor Agnostic Streaming Data Processing Pipeline (DPP) processing via Generic PACIM embodiment. Note that this DPP operates equally well in forensic mode over historical data. Steps comprise ingestion of Multi-Modal Multi-Sensor Data 105, potentially mixed with Environmental Effects 110 feeding the DPP. Input Data 105 comprises sensor dependent data sources. The DPP comprises Probabilistic Detection/Segmentation 115 providing input to Probabilistic Multi-Event Tracking & Association 120 providing input to Probabilistic Feature Extraction and Optimization 125 providing input to Probabilistic Classification & Activity Recognition 130. Performance measurement for each stage in the DPP enables Performance Diagnosis 135 which provides input to Adaptation 140 that improves performance of each stage in the DPP. This closed-loop characteristic adds on-the-fly performance-driven DPP adaptation to changing environments and behaviors.

Figure 1B:
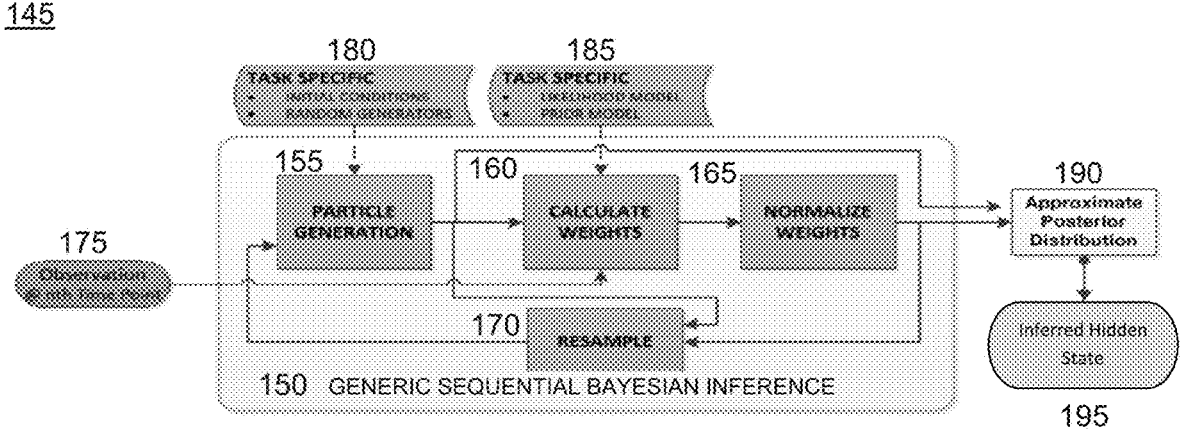
FIG. 1B shows a flowchart of one embodiment of the core generic Sequential Bayesian inference module of the present invention.

FIG. 1B is a flowchart 145 of an embodiment of the Generic Sequential Bayesian Inference module of PACIM. The portion of the model uses observations at nth time points and generates particles, calculates weights, normalizes weights, and/or resamples to obtain approximate posterior distribution and an inferred hidden state. In certain embodiments, an online generic probabilistic inference is used in all processing areas ensuring optimal performance with respect to energy, speed, and accuracy. The model comprises Generic Bayesian Inference module 150. Generic Sequential Bayesian Inference module 150 comprises Particle Generation 155; Calculate Weights 160; Normalize Weights 165; and Resample 170. Generic Sequential Bayesian Inference module 150 is fed by Observation at nth Time Point 175. Also providing input to Generic Sequential Bayesian Inference module 150 are Task Specific Initial Conditions and Random Generators 180 and Task Specific Likelihood Model and Prior Model 185. Output of Generic Sequential Bayesian Inference module 150 provides input to Approximate Posterior Distribution 190 which provides input to Inferred Hidden State 195.

$$\hat{p}(x_{n+1} \mid y_{1:n+1}) \propto \sum_{m=1}^{M} w_n^{(m)} p(x_{n+1} \mid x_n^{(m)}) p(y_{n+1} \mid x_{n+1}) \quad \text{Equation 1}$$

In Equation 1, online inference about an unobserved state which varies over time is shown, where $y_n$ denotes observation at $n^{th}$ time point; $x_n$ denotes the value of state at that time. Equation 1 assumes an appropriate Bayesian prior for $x_1$, and a model $P(x_{n+1}|x_n)$ and $P(y_n|x_n)$. Interest is in the Posterior Distributions $P(x_n|y_{1:n})$ for all n=1, 2, 3, . . . . For a given time point n, an embodiment of Generic Sequential Bayesian Inference approximates the posterior distribution at time n+1 $P(x_{n+1}|y_{1:n+1})$ by a set of M weighted particles. The particles $\{x_n^{(m)}\}_{m=1}^{M}$ are potential realizations of the state (particle generation). Each particle is assigned a weight, $\{w_n^{(m)}\}_{m=1}^{M}$ denotes a set of weights (calculate weights). The set of weights is normalized to sum to 1 (normalize weights). Resampling then eliminates particles with small weights and replicates the ones with large weights (resample).

Figure 2:
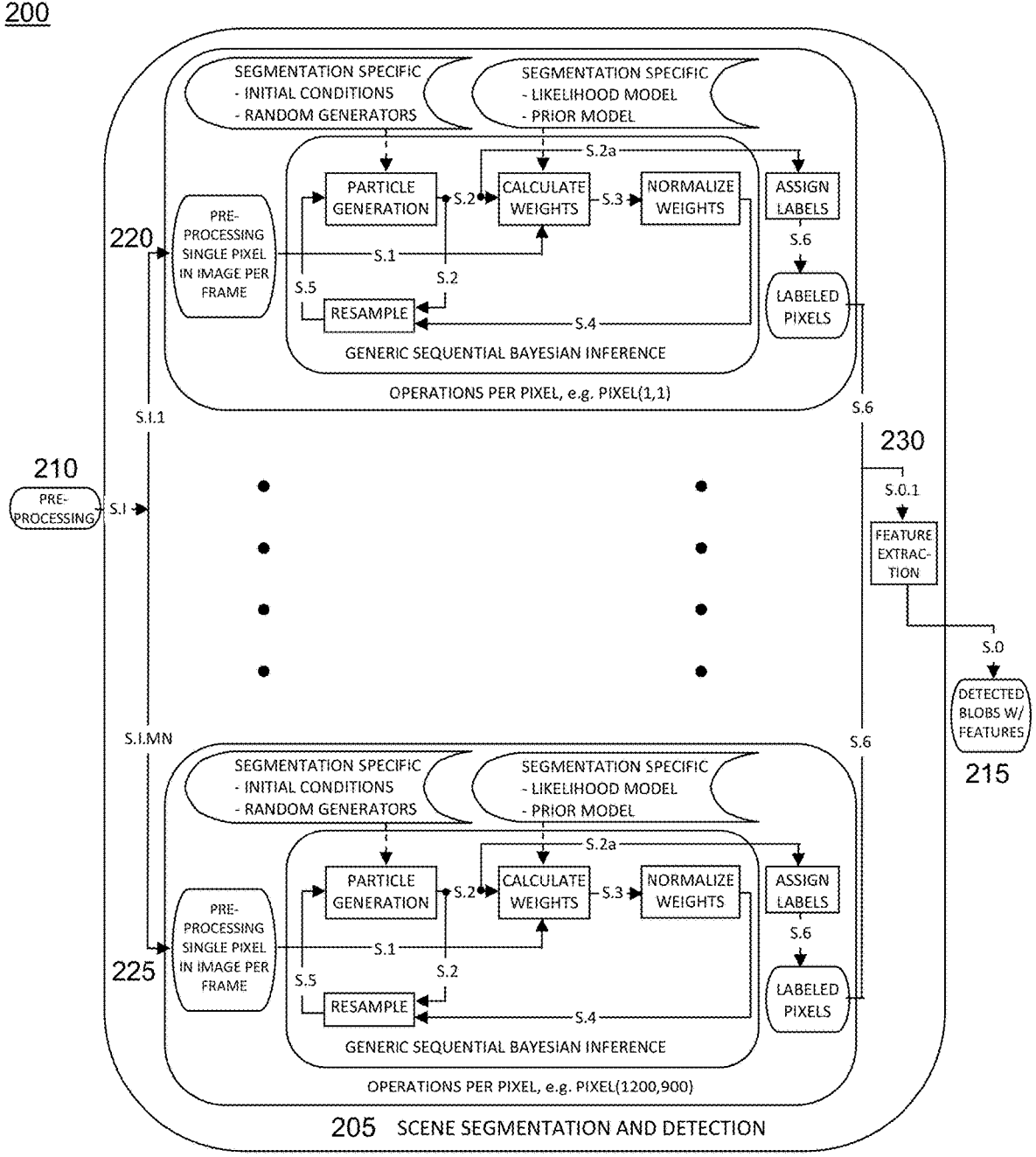
FIG. 2 shows a flowchart of one embodiment of the probabilistic detection and segmentation portion of the generic probabilistic inference model of the present invention using streaming multimodal data.

FIG. 2 is a flowchart 200 showing the probabilistic detection and segmentation portion of the generic PACIM of an embodiment using streaming multimodal imagery/video data as an illustrative example. More specifically, in certain embodiments each pixel color value (RGBs) and optionally the spatiotemporal image gradient are represented as a random variable. Components comprise Scene Segmentation and Detection steps 205 which have input from Pre-processing 210. Scene Segmentation and Detection steps 205 output Detected "Blobs" with Features 215. A blob is a region in a digital image that differs in properties compared to surrounding regions. A blob can be a region of an image in which some properties are constant or approximately constant; all the points in a blob can be considered in some sense to be similar to each other. Within Scene Segmentation and Detection steps 205 are Operations per Pixel e.g. Pixel (1,1) 220 progressing to Operations per Pixel e.g. Pixel (1200,900) 225. This then provides input to Feature Extraction 230 which provides input to Detected "Blobs" with Features 215. Operations within each of Operations per Pixel e.g. Pixel (1,1) 220 and Operations per Pixel e.g. Pixel (1200,900) 225 are detailed in FIG. 1B.

FIG. 3 shows an embodiment of an example of the data processed in the probabilistic detection and segmentation portion of the generic PACIM 300 for the example presented in the preceding paragraph. More specifically, the data S.I, S.O.1, and S.O are shown in FIG. 2. S.I is shown as data after preprocessing (e.g., a single image frame) and S.O.1 is intermediate output used for feature extraction. S.O is akin to "blobs" with features.

Figure 4:
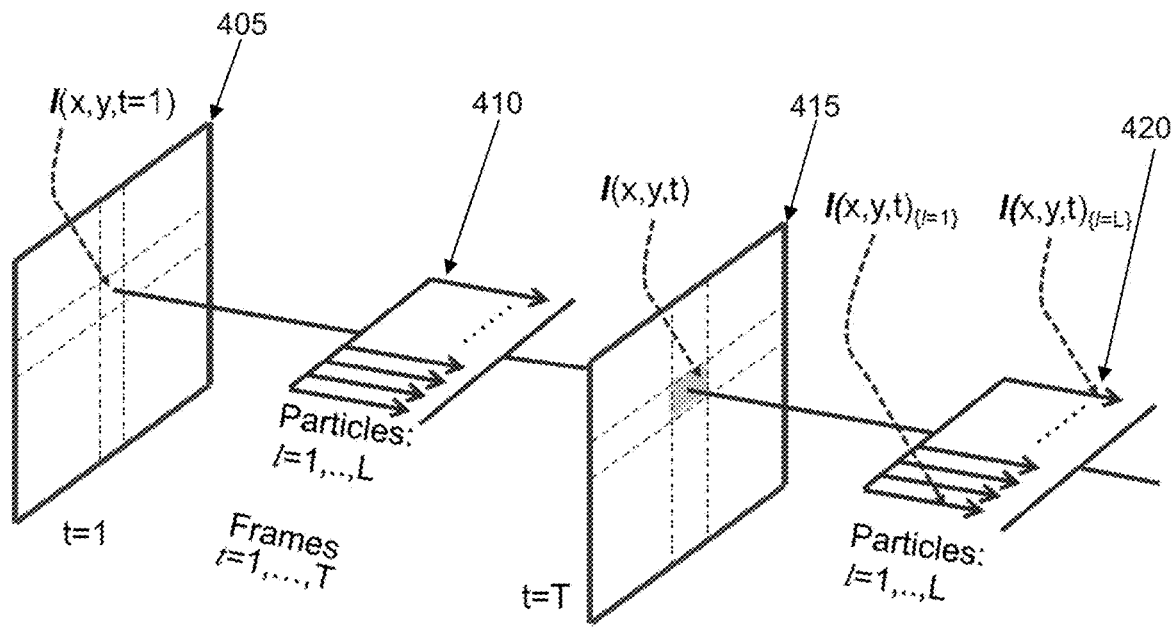
FIG. 4 shows a diagram of one embodiment of the probabilistic detection and segmentation procedure of the present invention.

FIG. 4 is a diagram 400 of one embodiment of the probabilistic detection and segmentation portion of the generic probabilistic inference model. Depicted are pixel x,y at time t=1 405; Particles from this pixel 410; pixel x,y at time t=T 415; and Particles from this pixel 420.

In one embodiment, test data were used to measure the performance metrics for the probabilistic detection and segmentation portion of the generic PACIM. There, the test data contained video sequence input images (1200×900 pixels) at 2.67 Giga pixels per frame, see Table 1 and Table 2.

TABLE 1

| Probabilistic Segmentation (MoPs) | Fixed Point | Floating Point |
| --- | --- | --- |
| Sensitivity | 0.86 | 0.78 |
| Specificity | 0.98 | 0.99 |
| Positive Predictive Value (PPV) | 0.90 | 0.98 |
| Negative Predictive Value (NPV) | 0.98 | 0.97 |

TABLE 2

| Probabilistic Detection and Segmentation Algorithms | |
| --- | --- |
| Algs. In fixed-point arithmetic | @ 4-, 6-, 8-bit |
| Ops Count | ~52 Ops/pixel |
| Memory | 1448 bits/pixel @ 8-bit (~1.5 Gbits total 1200 × 900 pixels, 2 frames history) |

Figure 5:
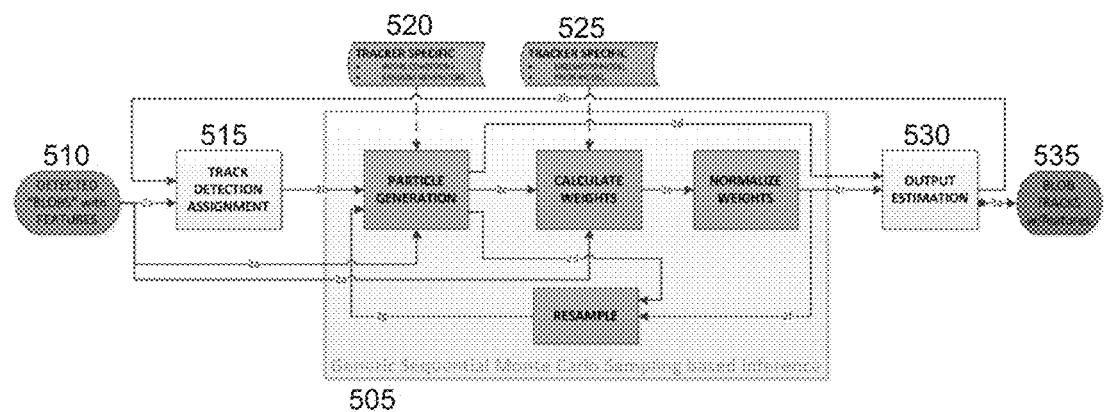
FIG. 5 shows a flowchart of one embodiment of the probabilistic multi-event tracking and association portion of the generic PACIM of the present invention.

FIG. 5 is a flowchart 500 of an embodiment of the probabilistic multi-event tracking and association portion of the generic PACIM. More specifically, the detected "blobs" with features are input as a set of features (e.g., color, shape, size, etc.) as random variables. The probabilistic multi-event tracking and association portion associates detections corresponding to the same object over time based on features (i.e., motion, color, shape) and the motion of each track is estimated by a particle filter. In certain embodiments, the filter is used to predict the track's location in each frame, and determine the likelihood of each detection being assigned to each track. In any given frame, some detections may be assigned to tracks, while other detections and tracks may remain unassigned. The assigned tracks are updated using the corresponding detections. The unassigned tracks are marked invisible. An unassigned detection begins a new track. The output estimation from this portion of the model is akin to blob tracks with features. Components comprise Generic Sequential Bayesian Inference module 505 (see FIG. 1B 135), with inputs from Detected "Blobs" with Features 510; Track Detection Assignment 515; Tracker Specific Initial Conditions and Random Generators 520 and Tracker Specific Likelihood Model and Prior Model 525. Output Estimation 530 receives output from Generic Sequential Bayesian Inference module 505 and provides input to Blob Tracks with Features 535.

FIG. 6 is a diagram 600 of one embodiment of the probabilistic tracking and association portion of the generic PACIM for single-target, feature-based tracking. Depicted are $Z_n$ Features (n=1) 605; Particles from these Features 610; $Z_n$ Features (n=T) 615; and Particles from these Features 620. Note the structural similarity between FIG. 6 and FIG. 4, which illustrates the generic re-use of a processing pattern for distinct stages in the DPP.

FIG. 7 is a diagram 700 of one embodiment of the probabilistic tracking and association portion of the generic probabilistic inference model for multi-target, feature-based tracking. Depicted are $Z^1$(Features (n=1)) and $Z^2$(Features (t=1)) 705; Particles from these Features 710; $Z^1$(Features (n=T–j)) and $Z^2$(Features (n=T–j)) 715; and Particles from these Features 720. Again note the replication of the basic processing pattern for each tracked target.

In one embodiment, test data were used to measure the performance metrics for probabilistic multi-event tracking and association portion of the generic PACIM; see Table 3.

TABLE 3

| Probabilistic Tracking | Ops/Track @ 6-bit | Memory Estimates/ Frame @ 6-7 bit | RMS Error | Target Purity |
| --- | --- | --- | --- | --- |
| HW Constraints | 440,000 | 35 bits/pixel | <20 pixels | ~1 |
| IM Tracking Fixed-point Arithmetic | ~199,967 | ~8 bits/pixel | ~12 pixels | ~1 |

Figure 8:
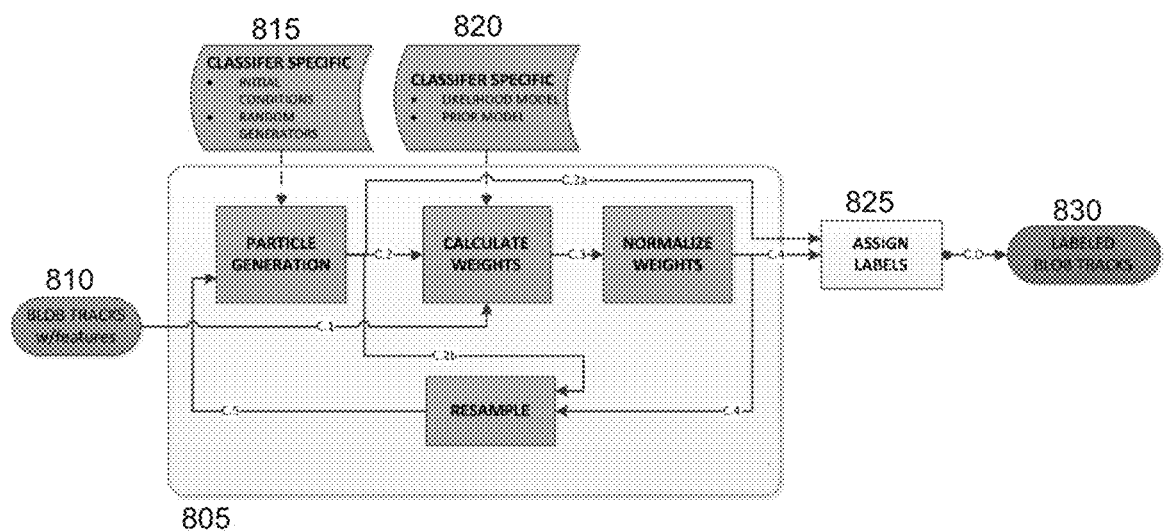
FIG. 8 shows a flowchart of one embodiment of the probabilistic classification and activity recognition portion of the generic probabilistic inference model of the present invention.

FIG. 8 is a flowchart 800 of one embodiment of the probabilistic classification and activity recognition portion of the generic probabilistic inference model. More specifically, the "blob track with features" input is represented in certain embodiments as a set of features (e.g., curvature, banding energy, change in direction, etc.) as random variables. Components comprise Generic Sequential Bayesian Inference module 805 (see FIG. 1B 135), with inputs from Blob Tracks w/ Features 810; Classifier Specific Initial Conditions and Random Generators 815 and Classifier Specific Likelihood Model and Prior Model 820. Assign Labels 825 receives output from Generic Sequential Bayesian Sampling Based Inference module 805 and provides input to Labeled Blob Tracks 830.

In embodiments, a form of learning-based automatic target recognition (ATR) is possible using PACIM. PACIM's cognitive ATR architecture learns/adapts under uncertainty from limited multimodal and multi-view observations. In certain embodiments, PACIM's cognitive ATR architecture learns compact target representations online from passive and/or active sensors. PACIM's cognitive ATR architecture enables accurate target recognition within a small onboard Size, Weight, and Power (SWaP) envelope.

In certain embodiments, PACIM synthesizes Deep Belief Networks (DBNs) to learn feature representations from imagery data (Feature Production); Incremental Hierarchical Nonparametric Bayesian (HBNP) machine learning methods to learn and recognize known and unknown targets in real time (Open Set Classification); and Generic Sequential Bayesian Inference for use in all major processing areas. Note that for Feature Production many other forms of layered processing can substitute for DBNs in alternative embodiments.

Figure 9:
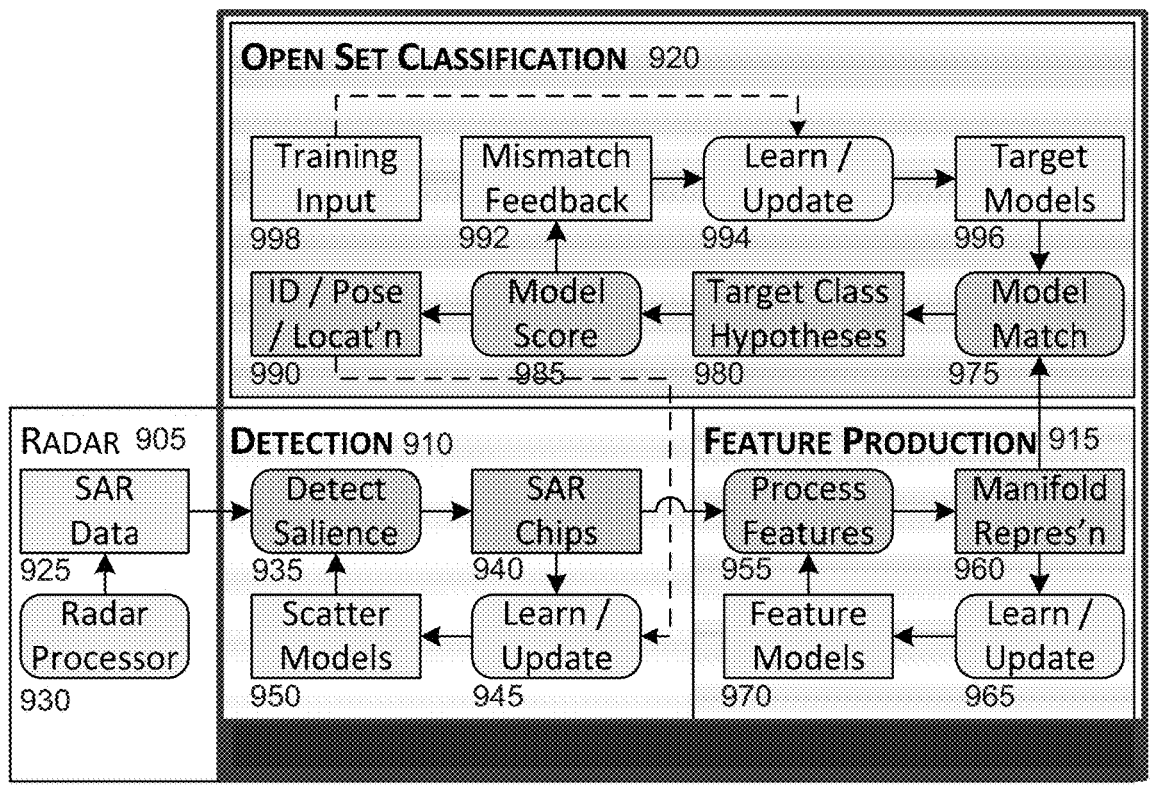
FIG. 9 shows a flowchart of one embodiment of the cognitive automatic target recognition application using the generic parallelizable probabilistic approximate computing inference model (PACIM) of the present invention.

FIG. 9 is a flowchart 900 of one embodiment of a cognitive automatic target recognition platform using the generic PACIM. More specifically, for this embodiment, PACIM's direct processing pipeline (Detect Salience, SAR Chips, Process Features, Manifold Representation, ID/Pose/ Location, Model Score, Target Class Hypotheses, and Model Match blocks) from input data through ID/pose/location estimation (classification stage output) features adaptive modeling loops for each stage (detection, feature production, open set classification, etc.). Components comprise Detection 910, Feature Production 915, and Open Set Classification 920. Input to Detection 910 comprises Radar 905 which has Radar Processor 925 providing input to SAR Data 930. Note that this is one of many possible input data source embodiments for this PACIM application; this application can also accommodate multiple simultaneous input sources. SAR Data 930 is input to Detect Salience 935 in Detection module 910. Also in Detection module 910 are SAR Chips 940, Learn/Update 945, and Scatter Models 950. Feature Production module 915 comprises Process Features 955, Manifold Representation 960, Learn/Update 965, and Feature Models 970. Open Set Classification 920 comprises Model Match 975, Target Class Hypotheses 980, Model Score 985, ID/Pose/Location 990, Mismatch Feedback 992, Learn/Update 994, Target Models 996, and Training Input 998.

This embodiment of PACIM is a cognitive Automatic Target Recognition (ATR) application that: recognizes known and unknown targets—learns unknown targets on-the-fly; performs on active and/or passive multimodal data—fuses multi-sensor inputs; and is designed for low size, weight, and power (SWaP) applications. This application performs online learning of compact target representations; learns from limited multimodal and multi-view observations; and operates and adapts under uncertainty.

PACIM's ATR application (PACIM-ATR) synthesizes Deep Belief Networks (DBNs) to learn abstract discriminative feature representations from high-dimensional data and Hierarchical Non-Parametric Bayesian (HNPB) machine learning methods to model targets of interest (including unknowns) from few examples within a self-organizing target class hierarchy that shares information between related classes. PACIM's probabilistic algorithms feature fast and energy efficient Generic Sequential Bayesian Inference (GSBI).

PACIM-ATR (similar to the imagery/video application described earlier) comprises an efficient multi-step processing pipeline (another DPP embodiment). In certain embodiments, it is a three step process of 1) detection (chips), 2) feature production (features) and 3) open set classification to provide target classes from input data.

In the detection step, PACIM-ATR finds relevant scene objects and events.

Figure 10:
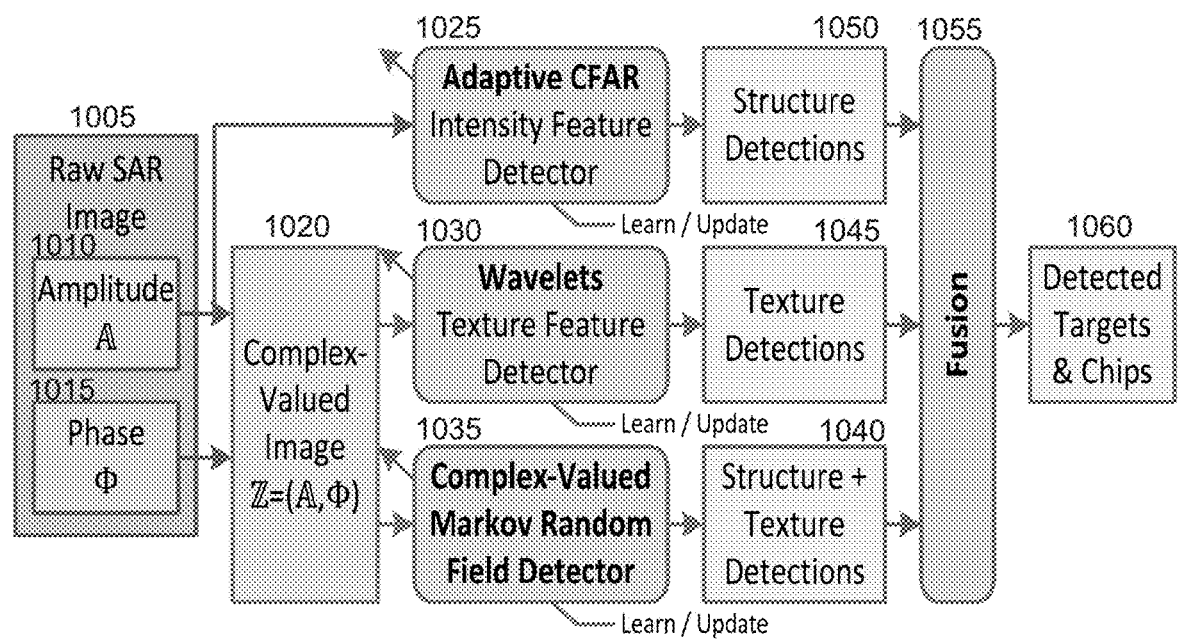
FIG. 10 shows a flowchart of one embodiment of the detection step for the cognitive automatic target recognition application using the generic PACIM of the present invention.

FIG. 10 is a flowchart 1000 of one embodiment of the detection step for the PACIM-ATR cognitive automatic target recognition application. More specifically, PACIM-ATR may employ multiple detectors and take advantage of complementary strengths over a range of operating conditions to exploit different aspects of complex (e.g., magnitude and phase) data. In certain embodiments, PACIM fuses over independent detections to improve probability of correct detection (Pd)/false alarms (Pfa). In certain embodiments, Bayesian fusion combines multimodal detections and deals with uncertainty and missing data. PACIM finds salient 'events' per frame. In certain embodiments, this tunable process can favor Pd over Pfa to minimize missed detections and produce detection area chips for feature production. The embodiment depicted in FIG. 10 represents a subset of the possible detector types within the scope of this invention. Components comprise Raw SAR Image 1005 comprising Amplitude 1010 and Phase 1015 information. Raw SAR Image 1005 provides input to Complex Valued Image module 1020 and Adaptive CFAR module 1025. Complex Valued Image module 1020 provides input to modules for Wavelets 1030 and Complex-Valued Markov Random Field Detector 1035. Complex-Valued Markov Random Field Detector 1035 provides input to Structure+Texture Detections module 1040. Wavelets module 1030 provides input to Texture Detections module 1045. Adaptive CFAR module 1025 provides input to Structure Detections module 1050. Structure+Texture Detections 1040, Texture Detections 1045, and Structure Detections 1050 modules provide input to Fusion module 1055 which provides input to Detected Targets & Chip module 1060.

Figure 11A:
FIGS. 11A 11B show SAR images used in the detection of targets of interest in one embodiment of the present invention.
Figure 11B:
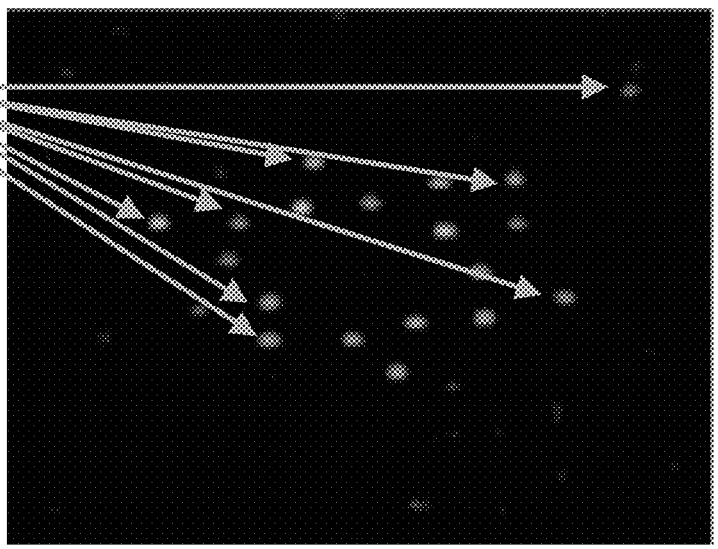

FIG. 11A and FIG. 11B depict a SAR image 1100 from which PACIM-ATR detected targets of interest 1105 (subset indicated by arrows; all blobs in FIG. 11B are detections of possible targets). In certain embodiments, PACIM operates on multiple INTs: 1) SAR, 2) EO/IR, 3) and/or hyperspectral. PACIM-ATR takes advantage of complex imagery.

FIG. 12 is a flowchart 1200 of one embodiment of the feature production step for the PACIM-ATR cognitive automatic target recognition application. In certain embodiments, PACIM-ATR learns feature representations via DBNs. Deep Belief Networks (DBNs) learn layered feature representations. DBNs reconstruct input at visible layers from activation of hidden layers. In certain embodiments, online unsupervised learning creates abstract salient features via factorization. DBNs afford automatic unsupervised feature learning for high-dimensional datasets (e.g., SAR imagery). There is no need to rely on precise human-crafted input representations. The features learned by deep models enable more rapid and accurate classifier learning. PACIM-ATR extends DBN learning to be online via Generic Sequential Bayesian Inference.

Figure 13:
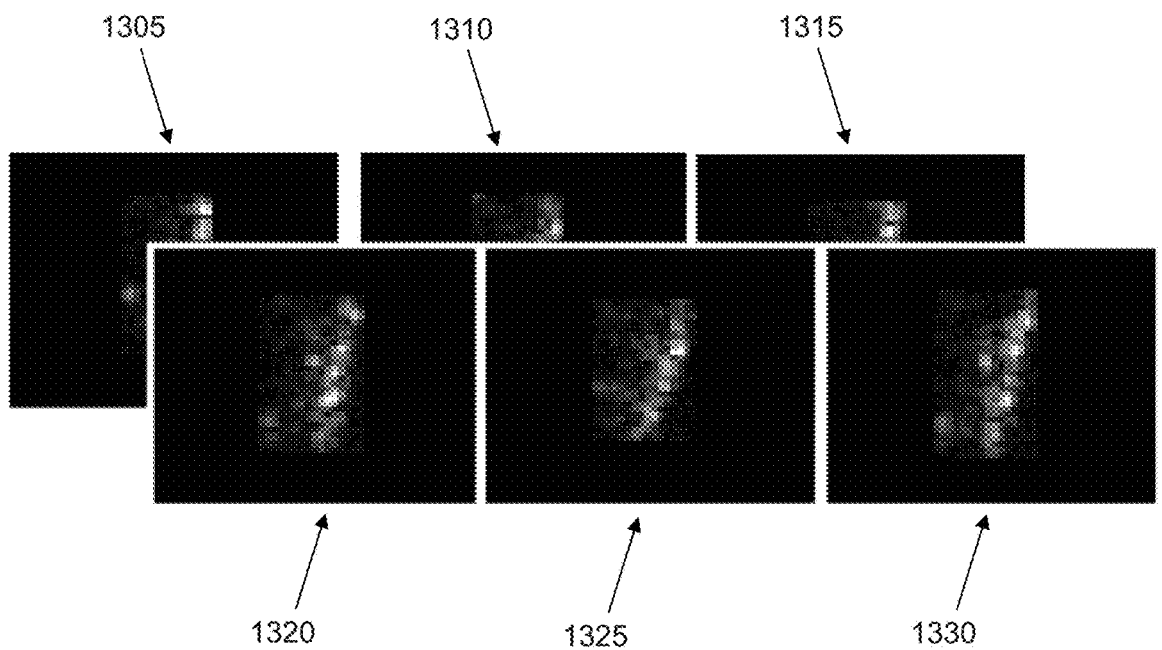
FIG. 13 shows multi-modal SAR chips used in feature production in one embodiment of the present invention.

FIG. 13 shows six separate SAR chips captured from different looks 1300 as used in feature production. Depicted are SAR representations 1305, 1310, 1315, 1320, 1325, and 1330.

Figure 14:
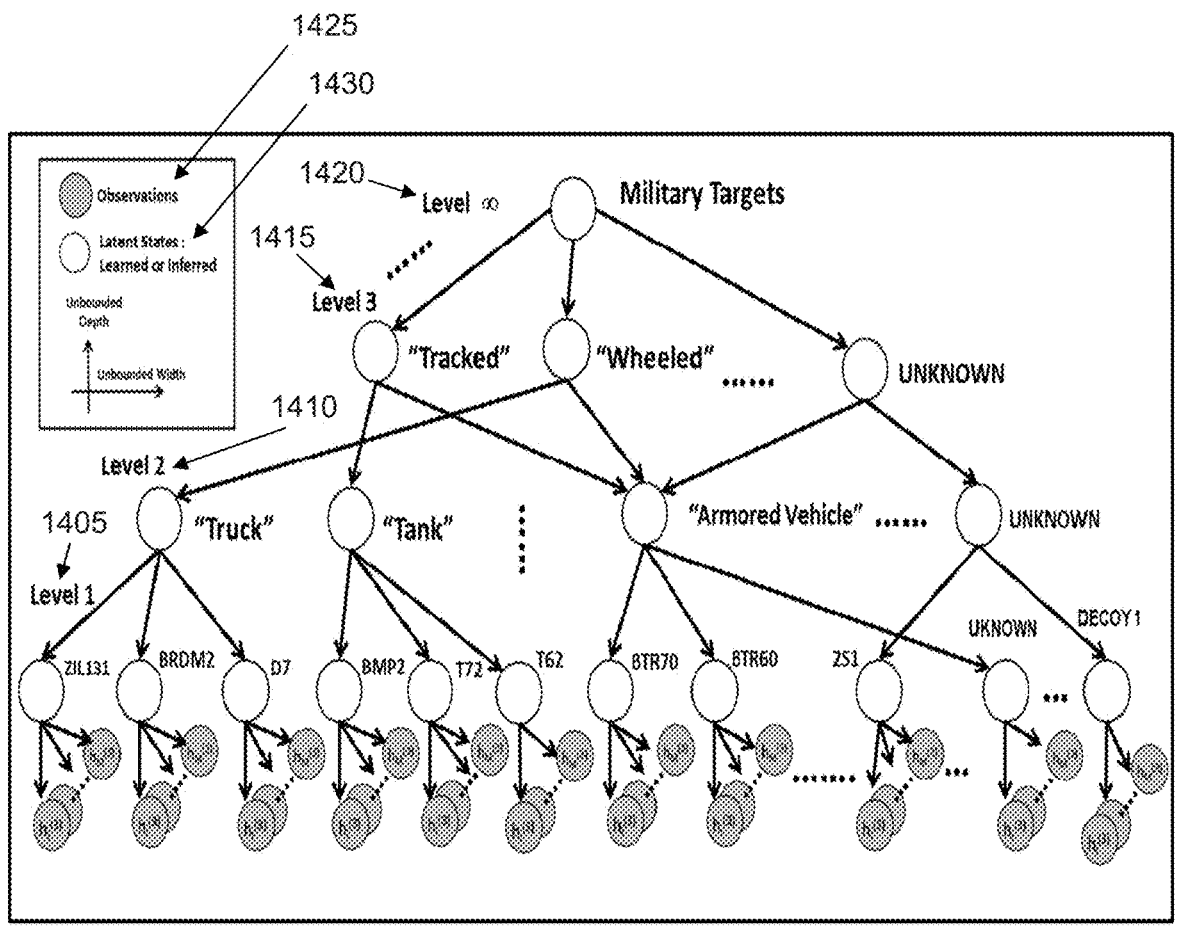
FIG. 14 shows a diagram of one embodiment of the classification step for the cognitive automatic target recognition application using the generic PACIM of the present invention.

FIG. 14 is a diagram 1400 of one embodiment of the learned representation for the classification step of the PACIM-ATR cognitive automatic target recognition application. More specifically, in some embodiments PACIM-ATR learns using a hierarchical Bayesian model over the activities of the top-level features in a DBN and a hierarchy of evolving classes of targets. Hierarchical Non-Parametric Bayesian (HNPB) models learn and recognize both known and unknown targets. PACIM-ATR discovers how to group classes into meaningful super-categories without assuming a fixed hierarchy of classes. PACIM-ATR determines, in self-organizing way, when the model encounters novel categories at all hierarchy levels. In certain embodiments, online/offline learning/estimation with inherently parallelizable Generic Sequential Bayesian Inference algorithm are used. PACIM-ATR reduces reliance on resource-intensive signature databases; learns novel categories within its representation from one (or few) labeled examples (e.g., one shot learning); and transfers acquired knowledge from previously learned class categories to novel class categories. PACIM-ATR's classification performance accuracy improves as learning data increase, but is good even with limited/sparse data. In certain embodiments, PACIM-ATR uses HNPB modeling to learn and recognize known and unknown targets in real time. PACIM-ATR learns targets and classes at multiple levels. Depicted are Level 1 1405, Level 2 1410, Level 3 1415, and Level ∞ 1420. Also depicted are Observations 1425 and Latent States: Learned or Inferred 1430.

Figure 15:
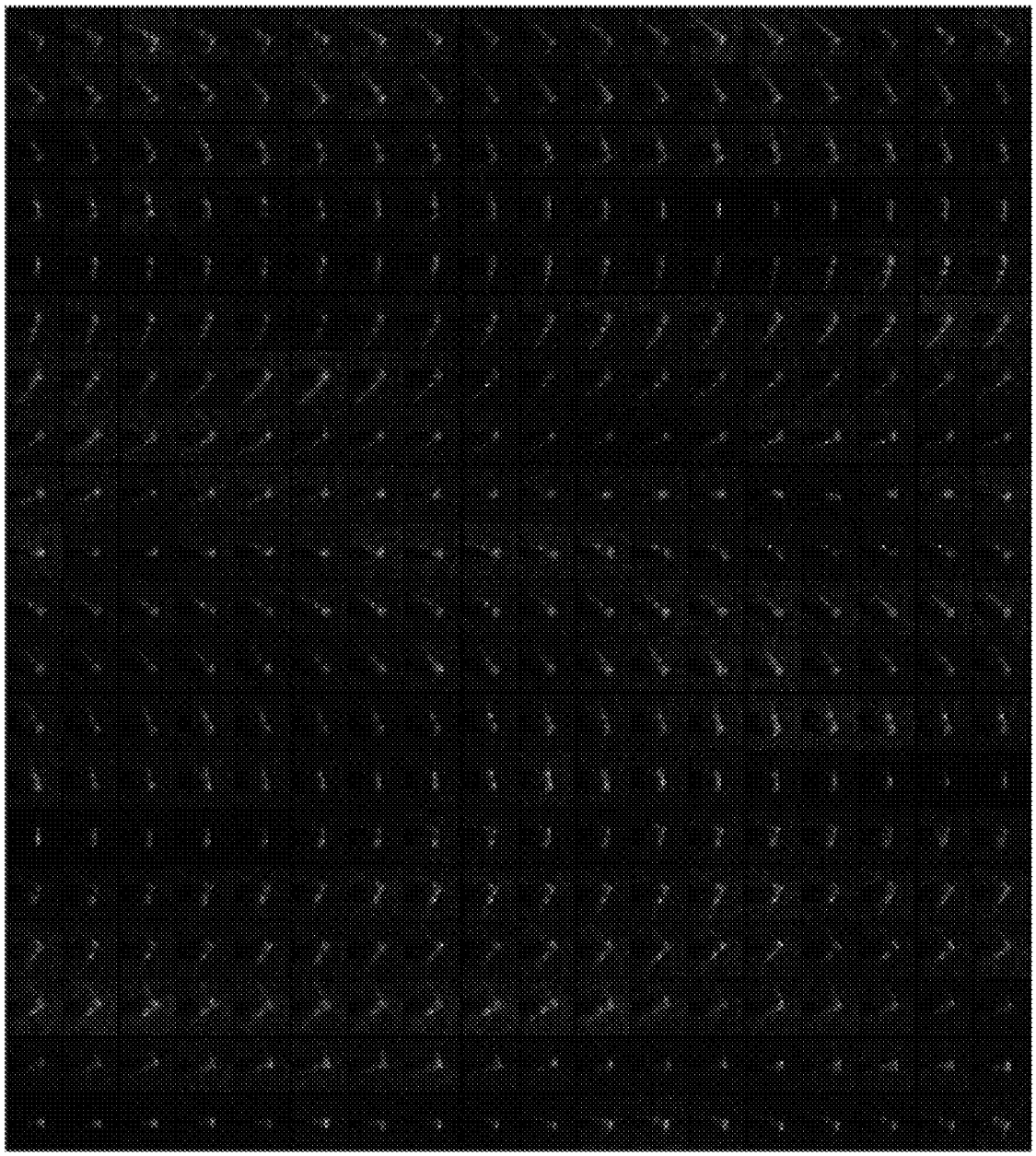
FIG. 15 shows one embodiment of data used (e.g. SAR images) in the detection step for the cognitive automatic target recognition application using the generic PACIM of the present invention.

FIG. 15 shows data 1500 used (e.g. SAR images) in one embodiment of the detection step for the PACIM-ATR cognitive automatic target recognition application. More specifically, there were 2,160 SAR images for six Target Classes that included tracked armored personnel transport—BMP1-C16, tracked SAM (surface to air missile) launcher in travel mode—SA13-D30, tracked tank—T72-A07, wheeled, armored personnel transport BRDM2-E72 & BTR70-C73, wheeled missile launcher—SCUD-R26, and the like. In one embodiment, the SAR images per target were one depression angle, 360 azimuths, and 50×50 SAR chips. In certain embodiments, the classification performance was under varying quantities of training/testing data, with known and unknown classes, and resulted in pose estimation/prediction.

Figure 16:
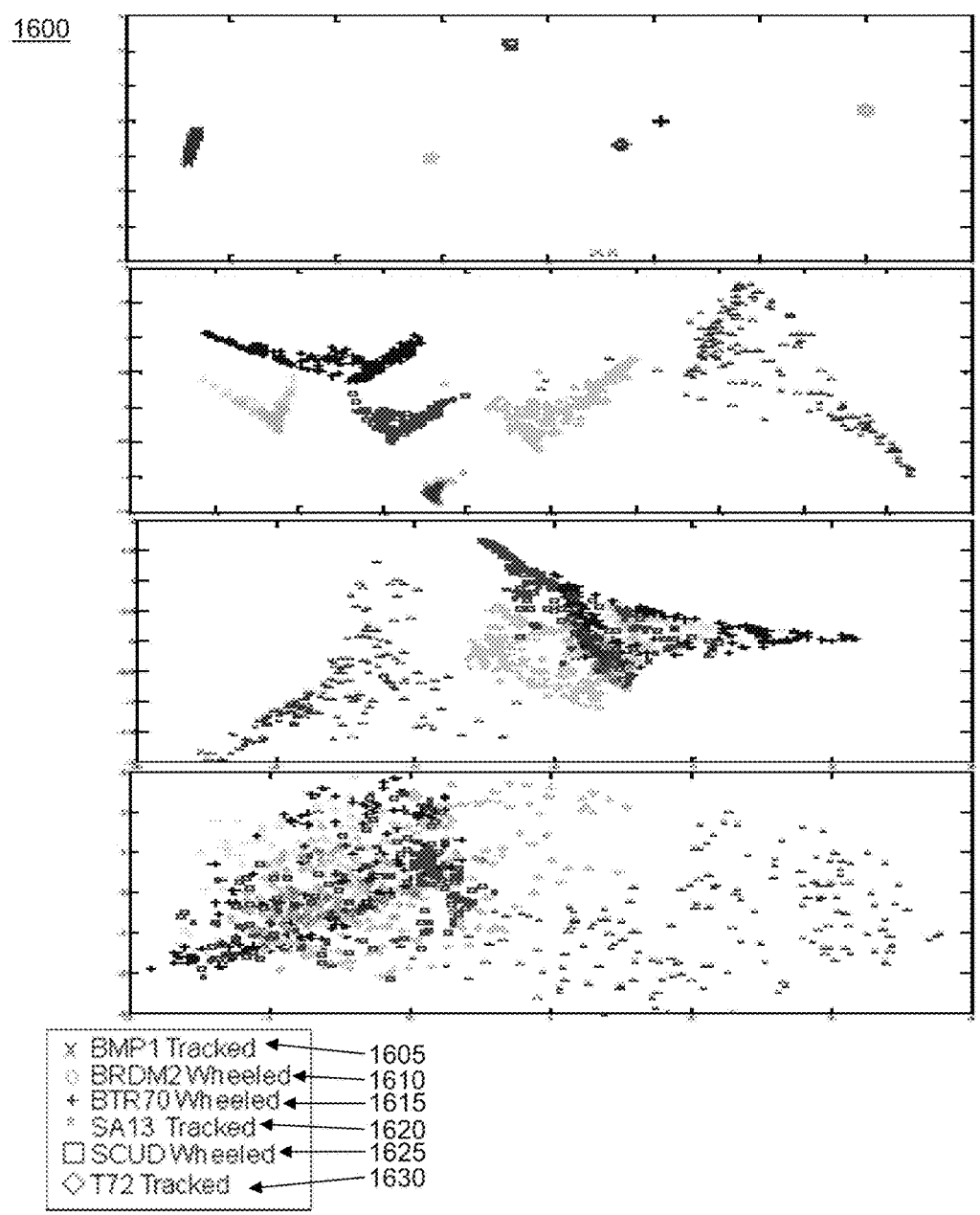
FIG. 16 shows a plot of various training and testing data used in one embodiment of the feature production step for the cognitive automatic target recognition application using the generic PACIM of the present invention.

FIG. 16 is a plot 1600 of multiple feature extraction DBN levels from the type of training data depicted in FIG. 15 as produced in one embodiment of the feature production step for the PACIM-ATR cognitive automatic target recognition application. Increasingly abstract multi-modality features at higher DBN levels facilitate subsequent classification processing. In certain embodiments, the cases progressively reduce the amount of training data needed. In one embodiment, the training data contained six classes; D=2500 (50× 50): Case 1: 70% of randomly selected SAR chips (azimuths) per class; Total N=1506 SAR chips; Case 2: 40% of randomly selected SAR chips (azimuths) per class; Total N=864 SAR chips; and Case 3: 10% of randomly selected SAR chips (azimuths) per class; Total N=216 SAR chips. In another embodiment, the test data utilized different azimuth angles from training: Case 1: 30% remaining observations from each class; N=648; Case 2: 60% remaining observations from each class; N=1296; and Case 3: 90% remaining observations from each class; N=1944. Shown classes are: BMP1 Tracked 1605, BRDM2 Wheeled 1610, BTR70 Wheeled 1615, SA13 Tracked 1620, SCUD Wheeled 1625, and T72 Tracked 1630.

Figure 17:
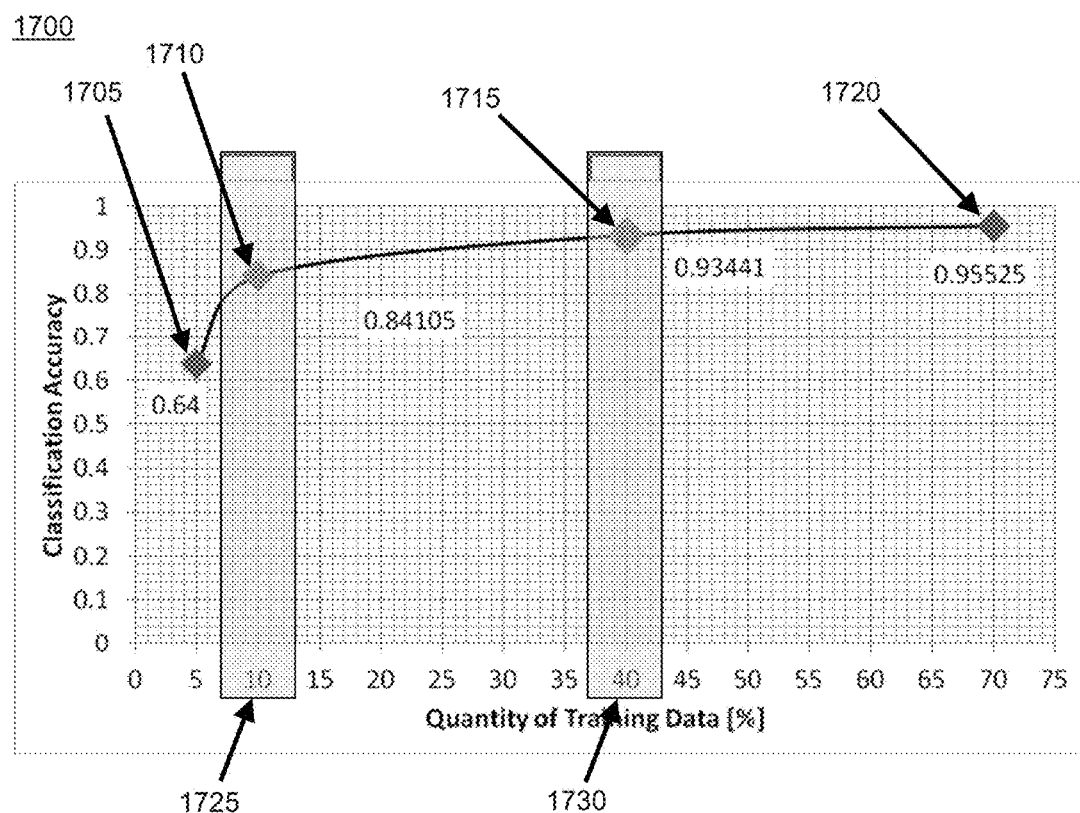
FIG. 17 shows performance analysis using limited training data for one embodiment of the cognitive automatic target recognition application using the generic PACIM of the present invention.

FIG. 17 shows performance analysis 1700 using limited training data for one embodiment of the PACIM-ATR cognitive automatic target recognition application. Classification Accuracy (0-1) is shown versus Quantity of Training Data (%). The four accuracy values shown are 0.64 1705, 0.84105 1710, 0.93441 1715, and 0.95525 1720, which correspond to using 5% 1705, 10% 1710, 40% 1715, and 70% 1720 of available data for training. Also highlighted are 36 Looks per Target 1725 and 144 Looks per Target 1730, which quantify the number of training examples for the 10% 1710 and 40% 1715 training data quantity performance points. This analysis demonstrates that performance remains relatively strong even when training uses as few as 36 looks per target 1725 (or 10% of available data 1710). Even with fewer training examples, performance decreases gracefully 1705 and not catastrophically.

FIG. 18 is a performance analysis table 1800 using limited training data for one embodiment of the PACIM-ATR cognitive automatic target recognition application. In one embodiment, the training data were 40% of randomly selected SAR images (azimuths) per class (six classes), N=864 (144/class); and the scoring data was 60% observations from each class, with distinct azimuth angles from learning, N=1296. The results depicted in confusion matrix form 1810 illustrate how well PACIM-ATR performed in this embodiment of PACIM-ATR and which types of errors it made (shown by off-diagonal entries 1820 in the matrix). The measures of performance box 1830 presents summary statistics quantifying the overall performance of this embodiment of PACIM-ATR.

In embodiments, a probabilistic machine learning approach accurately predicts known and unknown targets. In certain embodiments, PACIM-ATR groups classes into meaningful super-categories without assuming a fixed hierarchy of classes. In certain embodiments, PACIM-ATR discovers, in a self-organizing way, when the model encounters novel categories at all hierarchy levels. In one embodiment of the class hierarchy, each level 1 class describes a distribution over feature data values, each level 2 class describes a distribution over level 1 class model parameter values, and a single level 3 (universal) class describes distribution over level 2 class model parameters. In another embodiment, data from both known and unknown classes were used and resulted in performance metrics where the % correct for level 2 assignments was approximately 96.0% and the % correct for level 1 assignments was approximately 95.0%.

FIG. 19A and FIG. 19B show confusion matrix tables of % correct data 1900 in one embodiment of the PACIM-ATR cognitive automatic target recognition application. The first table 1905 depicts Level 1 Predicted Class versus Actual Class. The second table 1910 depicts Level 2 Predicted Class versus Actual Class. Both tables show strong performance from this hierarchical classification embodiment of PACIM-ATR.

In certain embodiments, the hierarchical, non-parametric Bayesian modeling approach for PACIM-ATR provides significant ATR benefits. Benefits include that the modeling feature only needs one (or few) labeled examples to learn a novel category in a representation; transfers acquired knowledge from previously learned class categories to novel class categories; discovers how to group classes into meaningful super-categories—without assuming a fixed hierarchy of classes; discovers, in a self-organizing way, when the model encounters novel categories at all hierarchy levels; precludes the need to expensively deduce target type prior to assigning class; and the learning and inference (search and matching) is performed in an online fashion. Additionally, while supervised classification utilizes a priori knowledge in the form of labeled training input data, a non-parametric modeling approach allows new class categories to be formed at any time in either supervised or unsupervised modes because it infers target class distributions over possible category structures by learning arbitrary hierarchies in unsupervised or semi-supervised mode; it autonomously assigns new instances into categories exploiting knowledge abstracted from a hierarchy of more familiar categories; the model hierarchy acts as index to more precise matches—from general to specific; and it reduces time-to-recognize, which contributes to a low SWaP footprint.

Figure 20:
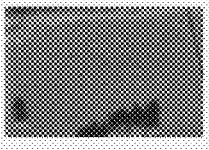
FIG. 20 shows the performance of one embodiment of the cognitive automatic target recognition application using the generic PACIM of the present invention.

FIG. 20 shows the performance of one embodiment of the PACIM-ATR cognitive automatic target recognition application. Aspects depicted are Input 2005, Detection 2010, Feature Production 2015, Classification 2020, and Results 2025. More specifically, PACIM-ATR enables accurate target detection and recognition within a small Onboard SWaP envelope. In one embodiment, the analysis assumptions († indicates conservative estimates) included are: image size=3600×3600 pixels; detections/image=1,000†; detection chip size=32×32 pixels; features=500†; energy/operation=100 pJ†; image frame rate=0.33 Hz (i.e., 3 seconds to process an image); memory precision=16 bits; detection parameters=20†; feature production hidden nodes=400; and feature production layers=4.

In certain embodiments, low SWaP reference implementation is used as a test-bed for performing design trades. In certain embodiments, the tracking of moving targets is accomplished. In certain embodiments, compact probabilistic target representations are used to achieve distributed ATR under constrained communication bandwidths.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method performed by at least one computer processing unit for online, probabilistic, approximate computational inference modeling of input representing features from streaming error-prone, noisy real world data to be labeled, said method comprising processing areas of:
   detecting and segmenting a plurality of signals to create a plurality of features (115), said detecting and segmenting comprising observed pixel values and labeled classified pixel background states (400);
   tracking and associating said plurality of features to create a plurality of tracks (120), said tracking and associating comprising track detection assignment and output estimation (500), (600), (700);
   extracting and optimizing said plurality of features (125) (230);
   classifying and recognizing said plurality of features and/or tracks (130), said classifying and recognizing comprising classifier conditions (815) and models (820) (800);
   wherein particle filtering comprises an online inference about an unobserved state which varies over time according to:

$$\hat{p}(x_{n+1} \mid y_{1:n+1}) \propto \sum_{m=1}^{M} w_n^{(m)} p(x_{n+1} \mid x_n^{(m)}) p(y_{n+1} \mid x_{n+1})$$

where $y_n$ denotes an observation at an $n^{th}$ time point; $x_n$ denotes a value of state at said $n^{th}$ time point;
   a model $p(x_{n+1} \mid x_n) \, p(y_n \mid x_n)$ is assumed;
   $p(x_n \mid y_{1:n})$ are posterior distributions for all $n=1, 2, 3, \ldots$ for a given time point n;
   whereby a Generic Sequential Bayesian Inference approximates the posterior distribution at time n+1 $P(x_{n+1} \mid y_{1:n+1})$ by a set of M weighted particles; and
   creating an output comprising one or more labels associated with said features and/or tracks;
   wherein said method is an online processing method performed in real time on said streaming error-prone, noisy real world data.

2. The method of claim 1, wherein a portion of the model processes observations collected within a time interval and generates particles, calculates particle weights, normalizes particle weights, and/or resamples particles to obtain approximate posterior distribution and an inferred hidden state.

3. The method of claim 1, wherein an online generic probabilistic inference is used in all processing areas, said processing areas comprising processing steps of said detecting and segmenting, said tracking and associating, said extracting and optimizing, said classifying and recognizing, and said creating one or more labels, providing performance with respect to energy, speed, and accuracy.

4. The method of claim 2, wherein a closed-loop characteristic adds on-the-fly performance-driven Data Processing Pipeline (DPP) adaptation to changing environments and behaviors.

5. The method of claim 1 wherein error tolerance inherent in algorithms of said online, probabilistic, approximate computational inference modeling accommodates noisy streaming data characterized by spatial and temporal ambiguities, occlusions, clutter, and large degrees of variability.

6. The method of claim 1 wherein said processing areas comprising processing steps of said detecting and segmenting, said tracking and associating, said extracting and optimizing, said classifying and recognizing, and said creating one or more labels comprises adaptive modeling loops for each stage comprising detection, feature production, and open set classification.

7. The method of claim 1 wherein said streaming error-prone, noisy real world data is produced from agnostic sensors and comprises any one of: intelligence, surveillance, and reconnaissance (ISR) data, video sequences and imagery, radio frequency (RF) signals, medical and biometric data comprising brain data and audio data, neuroscience data, consumer shopping, and finance data.

8. The method of claim 1, comprising Bayesian Probabilistic Models (BPMs) to characterize complex real-world behaviors under uncertainty.

9. The method of claim 1 comprising Sensor Agnostic Stream Processing and Generic Sequential Bayesian Inference (GSBI) whereby said method operates over Bayesian Probabilistic Models (BPMs) to process streaming or forensic data as a Data Processing Pipeline (DPP).

10. The method of claim 9, wherein online generic probabilistic inference is used in all processing areas, said processing areas comprising processing steps of said detecting and segmenting, said tracking and associating, said extracting and optimizing, said classifying and recognizing, and said creating one or more labels, ensuring performance with respect to energy, speed, and accuracy.

11. The method of claim 2, comprising resampling particles and wherein said resampling eliminates particles with small weights and replicates particles with large weights.

12. The method of claim 1, comprising detected blobs with features input as random variables, said features including phenomenology based features of curvature, banding energy, change in direction, centricity, area, volume, color, texture based features optical flow based features and manifold projected features generated by deep generative models.

13. The method of claim 1 wherein said model synthesizes Deep Belief Networks (DBNs) to learn feature representations from imagery data.

14. The method of claim 1, comprising Incremental Hierarchical Nonparametric Bayesian (HNPB) machine learning methods to learn and recognize known and unknown targets in real time, and predict their behavior when data is missing and/or obscured.

15. A system for online, probabilistic, approximate computational inference modeling of streaming error-prone, noisy real world video imagery data comprising:
a processor;
memory coupled to the processor, wherein said memory includes an online, hierarchical, probabilistic, approximate computational inference modeling module comprising one or more levels of class representation, probabilistic, wherein said approximate computational inference modeling module for each of a processing area, each of said processing areas comprising an instantiation of a direct processing pipeline to:
detect and segment a plurality of video imagery signals to create a plurality of features;
track and associate said plurality of features to create a plurality of tracks;
wherein particle filtering comprises an online inference about an unobserved state which varies over time according to:

$$\hat{p}(x_{n+1} \mid y_{1:n+1}) \propto \sum_{m=1}^{M} w_n^{(m)} p(x_{n+1} \mid x_n^{(m)}) p(y_{n+1} \mid x_{n+1})$$

where $y_n$ denotes an observation at an $n^{th}$ time point; $x_n$ denotes a value of state at said $n^{th}$ time point;
a model $p(x_{n+1}|x_n)$ $p(y_n|x_n)$ is assumed;
$p(x_n|y_{1:n})$ are posterior distributions for all n=1, 2, 3, . . . for a given time point n;
whereby a Generic Sequential Bayesian Inference approximates the posterior distribution at time n+1 $P(x_{n+1}|y_{1:n+1})$ by a set of M weighted particles; and
classify and recognize said plurality of tracks to create one or more labels;
wherein said method is an online processing method performed in real time on said streaming error-prone, noisy real world data.

16. The system of claim 15, wherein parameters for said processing areas comprise:
an image size of 3600×3600 pixels;
detections/image of 1,000;
a detection chip size of 32×32 pixels;
features of 500;
energy per operation of 100 pJ;
an image frame rate of 0.33 Hz;
a memory precision of 16 bits;
detection parameters of 20;
feature production hidden nodes of 400; and
feature production layers of 4.

17. The system of claim 15 wherein said processing areas comprise:
Detect Salience, SAR Chips, Process Features, Manifold Representation, ID/Pose/Location, Model Score, Target Class Hypotheses, and Model Match blocks from input data through ID/pose/location estimation features.

18. The system of claim 15 comprising said one or more levels of class representation wherein each of a level 1 class describes a distribution over feature data values, each of a level 2 class describes a distribution over level 1 class model parameter values, and a single level 3 universal class describes distribution over level 2 class model parameters.

19. The system of claim 15, wherein said system comprises a confusion matrix (1800).

20. A non-transitory computer-readable storage medium including instructions that are configured, when executed by a computing system, to perform a method for online, probabilistic, approximate computational inference modeling of streaming error-prone, noisy real world data for Automatic Target Recognition (ATR), the method comprising processing areas of:
detecting and segmenting a plurality of signals to create a plurality of features (115) for ATR;
tracking and associating said plurality of features to create a plurality of tracks (120); and
classifying and recognizing said plurality of tracks (130) to create one or more labels (825) using open set classification techniques for ATR;
wherein a Generic Sequential Bayesian Inference Model (805) is used in each of said processing areas;
wherein said method comprises adaptive modeling loops (900) for each of said processing areas of said detecting and segmenting creating said plurality of features, and said open set classification;
wherein particle filtering comprises an online inference about an unobserved state which varies over time according to:

$$\hat{p}(x_{n+1} \mid y_{1:n+1}) \propto \sum_{m=1}^{M} w_n^{(m)} p(x_{n+1} \mid x_n^{(m)}) p(y_{n+1} \mid x_{n+1})$$

where $y_n$ denotes an observation at an $n^{th}$ time point; $x_n$ denotes a value of state at said $n^{th}$ time point;
a model $p(x_{n+1}|x_n)$ $p(y_n|x_n)$ is assumed;
$p(x_n|y_{1:n})$ are posterior distributions for all n=1, 2, 3, . . . for a given time point n;
whereby a Generic Sequential Bayesian Inference approximates the posterior distribution at time n+1 $P(x_n|y_{1:n+1})$ by a set of M weighted particles; and
wherein said method is an online processing method performed in real time on said streaming error-prone, noisy real world data for ATR.

* * * * *